United States Patent
Myles et al.

(10) Patent No.: US 8,423,974 B2
(45) Date of Patent: Apr. 16, 2013

(54) SYSTEM AND METHOD FOR CALL REPLACEMENT

(75) Inventors: Gideon M. Myles, San Jose, CA (US); Julien Lerouge, Santa Clara, CA (US); Tanya Michelle Lattner, San Jose, CA (US); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 767 days.

(21) Appl. No.: 12/540,195

(22) Filed: Aug. 12, 2009

(65) Prior Publication Data

US 2011/0041183 A1 Feb. 17, 2011

(51) Int. Cl.
*G06F 9/44* (2006.01)

(52) U.S. Cl.
USPC ........................................................ 717/133

(58) Field of Classification Search ................... None
See application file for complete search history.

(56) References Cited

U.S. PATENT DOCUMENTS

| | | | | |
|---|---|---|---|---|
| 5,628,016 | A * | 5/1997 | Kukol | 717/140 |
| 6,934,939 | B2 * | 8/2005 | Ewart et al. | 717/152 |
| 7,039,919 | B1 * | 5/2006 | Hunt | 719/316 |
| 7,080,359 | B2 | 7/2006 | Ullmann et al. | |
| 7,181,603 | B2 | 2/2007 | Rothrock et al. | |
| 7,383,443 | B2 | 6/2008 | Zeman et al. | |
| 7,546,587 | B2 | 6/2009 | Marr et al. | |
| 2002/0013907 | A1 | 1/2002 | May | |
| 2004/0098713 | A1 * | 5/2004 | Ogawa et al. | 717/160 |
| 2004/0168078 | A1 | 8/2004 | Brodley et al. | |
| 2008/0141131 | A1 * | 6/2008 | Cerny et al. | 715/716 |
| 2009/0089507 | A1 * | 4/2009 | Chen et al. | 711/125 |

OTHER PUBLICATIONS

Tzi-Cker Chiueh, "Innovative Software-Based Anti-Tamper Techniques," Sphinx: Interpretation based Software Protection website, Sep. 2005, Computer Science Department, Stony Brook University, Stony Brook, New York (Available online at http://www.ecsl.cs.sunysb.edu/sphinx/design.doc, last visited on Aug. 11, 2009).

* cited by examiner

*Primary Examiner* — Kambiz Zand
*Assistant Examiner* — Leynna Truvan
(74) *Attorney, Agent, or Firm* — Novak Druce Connolly Bove + Quigg LLP (57) ABSTRACT

Disclosed herein are systems, computer-implemented methods, and computer-readable storage media for obfuscating a function call. The method receives a computer program having an annotated function and determines prolog instructions for setting up a stack frame of the annotated function and epilog instructions for tearing down the stack frame. The method places a first portion of the prolog instructions in the computer program preceding a jump to the annotated function and a second portion of the prolog instructions at a beginning of the annotated function. The method places a first portion of the epilog instructions at an end of the annotated function and a second portion of the epilog instructions in the computer program after the jump. Executing the first and second portions of the prolog instructions together sets up the stack frame. Executing the first and the second portions of the epilog instructions together tears down the stack frame.

26 Claims, 5 Drawing Sheets

SYSTEM AND METHOD FOR CALL REPLACEMENT

BACKGROUND

1. Technical Field

The present disclosure relates to software obfuscation and more specifically to call path replacement.

2. Introduction

A computer software vendor writes computer software as source code which is readable by a person trained to understand programming languages. Generally the vendor compiles that source code to object code that contains a list of instructions controlling what a computer does. That compiled code can be sold on physical media, downloaded for free, or distributed in any other suitable manner. However, malicious or mischievous individuals with enough time and resources can reverse engineer the compiled code and locate specific functions of interest in compiled computer code and exploit them by calling them directly. The reverse engineers can be individuals desiring to "hack" the compiled code to perform unintended functions, obtain keys, reveal trade secrets, or to achieve other questionable goals.

Once a hacker locates and reverse engineers the appropriate portions of object code, the software may be modified to perform in a manner not anticipated by the software vendor, potentially bypassing Digital Rights Management (DRM) or licensing restrictions, but also potentially causing great harm or injury. For example, a malicious user could alter legitimate code to include a virus or could alter operating software for dangerous machinery to disregard safety protocols.

Inasmuch as functions in traditional software are vulnerable to an attacker calling the function outside of its intended functionality which can lead to security issues for the software vendor, what is needed in the art is a way to prevent attackers from directly calling functions in a software package.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, computer-implemented methods, and tangible computer-readable storage media for obfuscating a function call. A system can include one or more of a processor, system, computer, computing device, etc. configured to practice the method. The system receives a computer program having an annotated function and determines prolog instructions for setting up a stack frame of the annotated function and epilog instructions for tearing down the stack frame. The system places a first portion of the prolog instructions in the computer program preceding a jump to the annotated function and a second portion of the prolog instructions at a beginning of the annotated function. The system places a first portion of the epilog instructions at an end of the annotated function and a second portion of the epilog instructions in the computer program after the jump. Executing the first and second portions of the prolog instructions together sets up the stack frame. Executing the first and the second portions of the epilog instructions together tears down the stack frame.

The jump instruction to the annotated function can jump to a location after a first location in the annotated function. The first location can be determined based on the first portion of the prolog instructions. The second portion of the first instructions can include all or part of the first portion of the prolog instructions. The jump instruction can jump to a location in the second portion of the prolog instructions based on the first portion of the prolog instructions.

In one embodiment, a compiler compiles an obfuscated function call. The compiler includes a processor, a receiving module configured to control the processor to receive a computer program listing having at least one annotated function, a determining module configured to control the processor to determine prolog instructions for setting up a stack frame of the annotated function and epilog instructions for tearing down the stack frame, a placement module configured to control the processor to place a first portion of the prolog instructions in the computer program listing preceding a jump instruction to the annotated function, place a second portion of the prolog instructions at a beginning of the annotated function, place a first portion of the epilog instructions at an end of the annotated function, and place a second portion of the epilog instructions in the computer program listing after the jump instruction, and a compiling module configured to control the processor to compile the received computer program listing based on the placed portions of the prolog and epilog instructions. Any of the variations discussed herein can be applied to this embodiment.

Another embodiment is a tangible computer-readable storage medium storing a computer program having instructions for controlling a processor to obfuscate a function call. The instructions, when executed by a processor, cause the processor to perform steps such as receiving a compiled computer program having an annotated function and determining prolog instructions for setting up a stack frame of the annotated function and epilog instructions for tearing down the stack frame. The instructions then cause the processor to place a first portion of the prolog instructions in the computer program listing preceding a jump instruction to the annotated function and place a second portion of the prolog instructions at a beginning of the annotated function. The instructions, when executed by a processor, also cause the processor to place a first portion of the epilog instructions at an end of the respective annotated function and place a second portion of the epilog instructions in the computer program listing after the jump instruction. Any of the variations discussed herein can be applied to this embodiment.

In yet another embodiment, a tangible computer-readable storage medium stores a computer program having program instructions for controlling a processor to perform certain steps. The program instructions are embedded with call obfuscation instructions. For example, the computer program can be an operating system, word processor, a music manager, a software library, or a video editing suite. With little to no disruption to the execution and performance of the computer program, the call obfuscation instructions execute a first portion of prolog instructions in a main computer program preceding a jump instruction to an annotated function and execute a second portion of the prolog instructions at a beginning of the annotated function. The combination of these two portions is functionally equivalent to an automatically generated prolog function generated by a standard compiler. The instructions then execute a non-prolog, non-epilog portion of the annotated function, which is the essentially the same as the function would be if a standard compiler generated the function. The instructions then execute a first portion of epilog instructions at an end of the annotated function, and execute a second portion of the epilog instructions in the main computer program after the jump instruction. Any of the variations discussed herein can be applied to this embodiment.

In yet another variation, a tangible computer-readable storage medium stores a computer program having instructions for controlling a processor to set up a stack frame. The instructions include performing a first portion of prolog instructions in a main computer program preceding a jump instruction in the main computer program to an annotated function, following the jump instruction to the annotated function, and performing a second portion of the prolog instructions at a beginning of the annotated function. After execution of the portion of the annotation function that does not depend on the epilog, the instructions perform a first portion of epilog instructions at an end of the annotated function, jump back to the main computer program, and execute a second portion of the epilog instructions in the main computer program. Any of the variations discussed herein can be applied to this embodiment.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
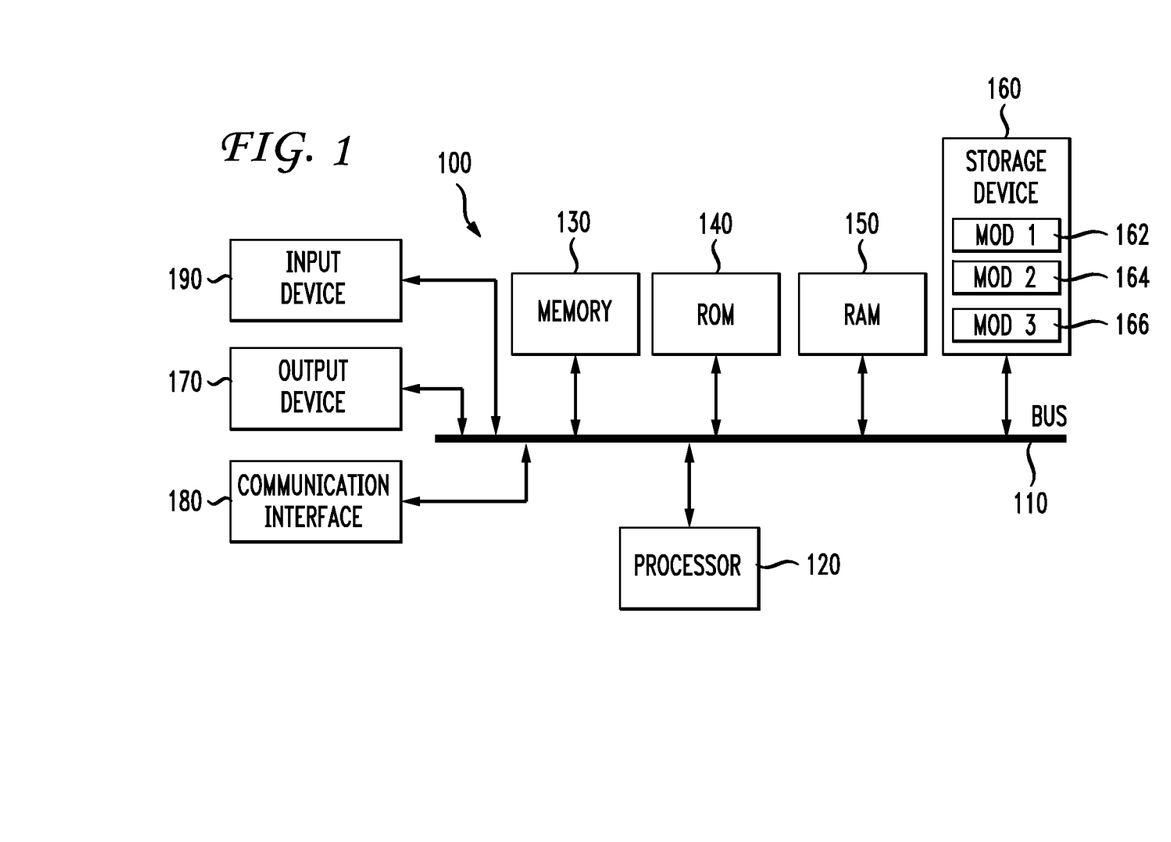
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 3:
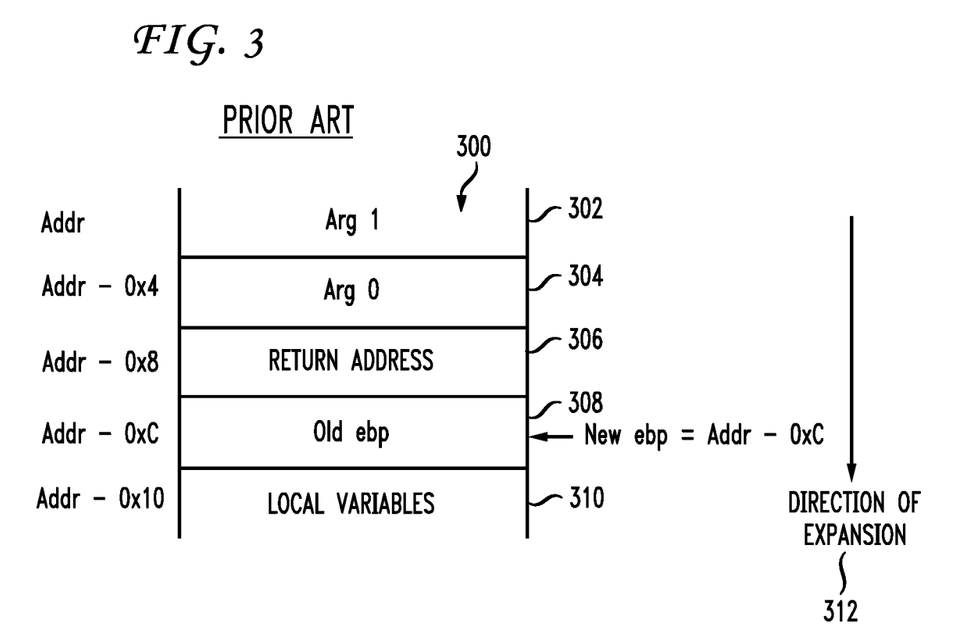
FIG. 3 illustrates an example prior art standard stack frame.

A function in a computer program relies on a stack of variables in a stack frame that contains local variables, arguments, CPU register contents, and other information for the function. When another part of the computer program or an entirely different program calls the function, the traditional and standard approach is to call a prolog function that sets up the stack frame for the function, execute the function, then call an epilog function that tears down the stack frame. FIG. 3 illustrates an example prior art standard stack frame 300 established by a prolog. The stack frame contains arguments 302, 304, a return address 306 which points to the calling function, the ebp 308 register value, and then the prolog sets up space to store local variables 310 declared in or used by the function. As new information is added to the stack frame, it expands downward 312 in this illustration. After the function exits, an epilog tears down the stack frame and eventually returns program execution to the return address 306. The prolog and epilog approach is generally standardized and performed by a compiler.

The approaches set forth herein can prevent an attacker from directly calling into a function. These approaches operate on individual functions. Standard function calls operate in a standard way for setting up and tearing down the stack frame with a compiler-generated prolog and an epilog associated with the function. This disclosure is a departure from the automatic compiler-generated prolog and epilog approach so that a function call does not set up and tear down the stack frame in the traditional manner. Some of the instructions in an equivalent prolog and epilog are performed at the call site and others are performed within the called function. Further, a JMP (or jump) instruction is used instead of a traditional function call. Similarly, an annotated function can include a jump instruction back to the calling main program or to another location. Instead of the prolog and epilog instructions being contained nicely at the beginning and ending of the function where an attacker would expect to find them, this approach splits them between the call site and the called function. One advantage of this approach is that if the function is called directly in an unauthorized manner, an incomplete second part of the prolog is executed, which may cause errors or data corruption to frustrate the unauthorized caller. In one aspect, the approach includes multiple different implementations of this concept so that if an attacker discovers one implementation, they do not necessarily know how to crack the others. For example, if one implementation of the obfuscation is to place half of the prolog instructions in the call site and half in the called function, one different implementation can be placing the first instruction at the call site and the remaining instructions in the called function. This approach can operate on processors of any processor architecture, including 32 bit and 64 bit x86, PowerPC, ARM, and others. The specific instructions for setting up a stack frame may differ between processor architectures, but the same principles and methods apply.

In yet another embodiment, the called function includes all of the prolog instructions. In this manner, each call site which calls that function can include a variable number of instructions. The jump instruction into the called function can be offset to account for how many of the prolog instructions have already been executed. This approach can also apply to the epilog. The approaches described herein can be performed at different levels, depending how much granularity is desired. The approach can be implemented at any stage between the source code and the binary, and even as a post-processing tool. Such a post-processing tool can be a software-based tool running on the same or a separate computing device. The tool can be integrated as part of the compiler or can be a separate software module.

Figure 2:
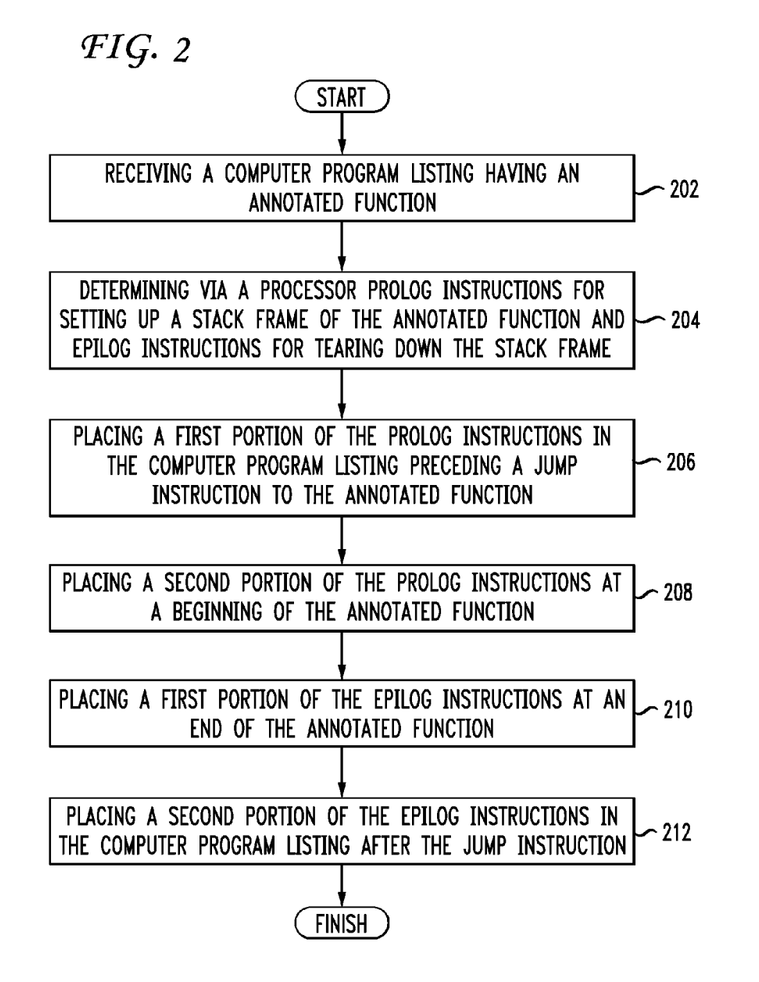
FIG. 2 illustrates an example method embodiment.

Having disclosed some basic system components and some fundamental concepts, the disclosure now turns to the exemplary method embodiment shown in FIG. 2. For the sake of clarity, the method is discussed in terms of an exemplary system 100, shown in FIG. 1, configured to practice the method.

FIG. 2 illustrates an exemplary method embodiment for obfuscating a function call. The system 100 implementing the method first receives a computer program listing having an annotated function (202). The computer program listing can be source code, intermediate code at any stage in a compiler, or can be the binary output of compiled source code. A human programmer and/or an automated tool annotates certain functions to indicate to the compiler or tool that the obfuscation technique is to be applied to those annotated functions. The annotations can include various levels of performance, complexity, security, or other flags, such as a randomize flag to randomize the obfuscation technique applied to a given function. Annotations can take the form of a function tag, all or part of a function name, a code comment, etc. In one aspect, annotations are in a separate location from the main program source code, such as a separate annotations file with references to the functions.

The system 100 determines prolog instructions via a processor for setting up a stack frame of the annotated function and epilog instructions for tearing down the stack frame (204). In some cases where a compiler has already generated a prolog and/or epilog, this process can be as simple as analyzing an existing prolog. In other cases, the system 100 determines the prolog instructions independently.

The system 100 places a first portion of the prolog instructions in the computer program listing preceding a jump instruction to the annotated function (206). In one variation, the prolog exists in the program, but it is not invoked because the jump instruction jumps into the function without calling the function in a traditional manner. In another variation, a traditional prolog and epilog are entirely absent, such as with a naked function. The system 100 places a second portion of the prolog instructions at a beginning of the annotated function (208). The first portion of the prolog instructions and the second portion of the prolog instructions set up the stack frame when executed in combination. The jump instruction to the annotated function can jump to a location after a first location in the annotated function determined based on the first portion of the prolog instructions. The placement of the second portion of the prolog instructions can be at the very beginning of the annotated function or it can be in the general beginning area. For example, if certain instructions of the function do not rely on the stack frame, they can be executed before some or all of the second portion of the prolog instructions. A tool, such as a software module controlling a processor, can analyze the function to determine which instructions rely on which portions of the stack frame and spread the prolog instructions out accordingly. Such a tool can even rearrange the instructions in the function as needed to accommodate interspersing some or all of the second portion of the prolog instructions. These principles can also apply to the first portion of the epilog instructions.

The system 100 places a first portion of the epilog instructions at an end of the annotated function (210). The end can be the exact end of the function or in the general vicinity as described above. These instructions can also be spread out as described above.

The system 100 places a second portion of the epilog instructions in the computer program listing after the jump instruction (212). The first portion of the epilog instructions and the second portion of the epilog instructions tear down the stack frame when executed in combination.

The second portion of the prolog instructions can include the first portion of the prolog instructions. For example, if the prolog instructions are A, B, C, D, E, and the first portion of the prolog instructions is A, B, then the second portion can include the first portion and the remaining instructions, or A, B, C, D, E. In this manner, the main program can call the same function at different times with different first portions of the prolog instructions and a corresponding jump instruction based on the first portion of the prolog instructions.

Figure 4:
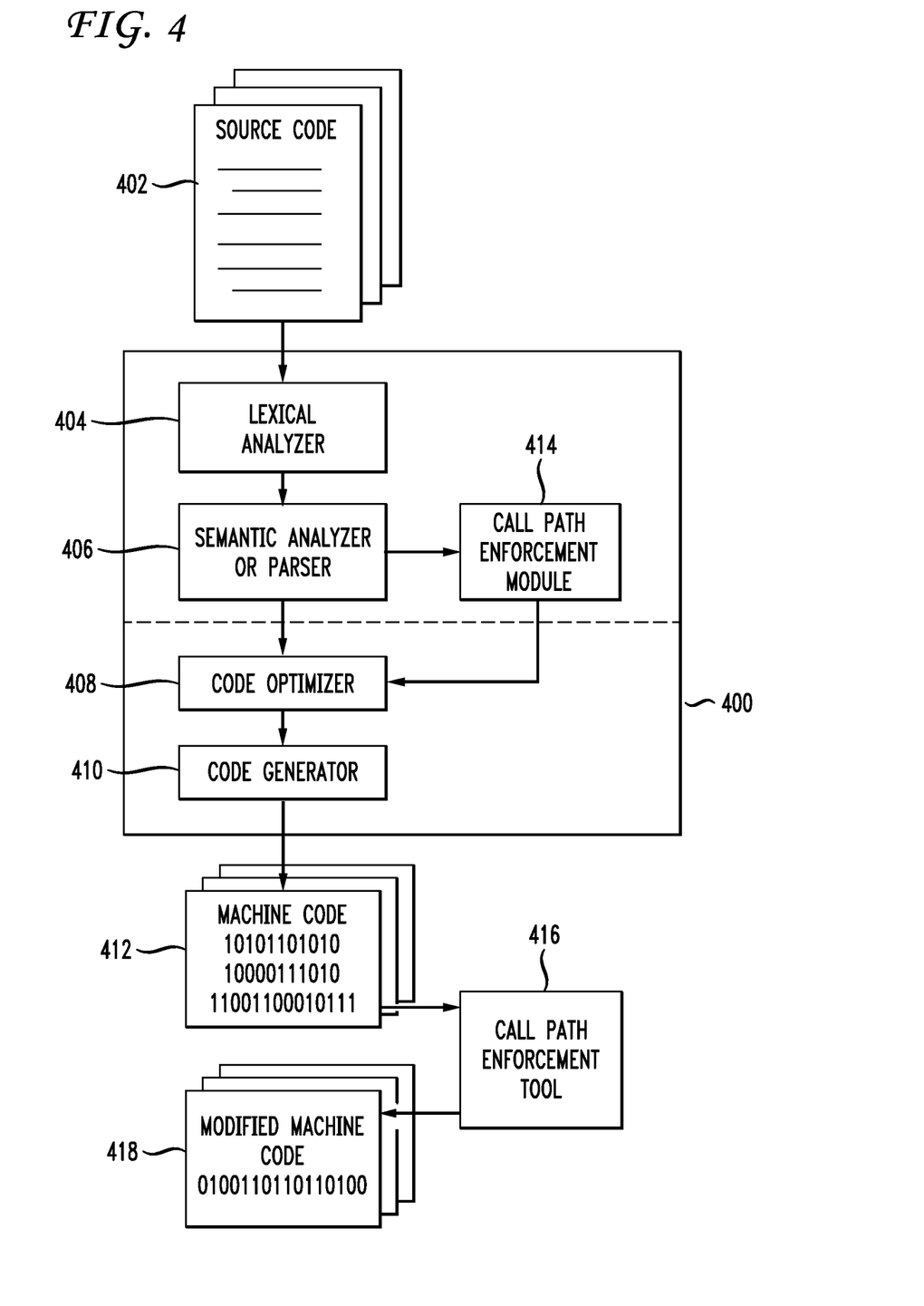
FIG. 4 illustrates an exemplary compiler.

FIG. 4 illustrates a block diagram of an exemplary compiler 400 including mechanisms for implementing call path enforcement 414, 416. A compiler 400 converts human-readable source code to object code which is understandable to and typically executable by a computing device 100. A compiler 400 is likely to perform the following representative operations as well as other operations: lexical analysis, preprocessing, parsing, semantic analysis, code optimization, and code generation. Compilers are important in the world of computer science and software because they allow programmers to write software using high level languages and convert those high level instructions to binary machine code.

The compiler 400 takes as input source code 402 for a computer program written in a programming language like Perl, Objective-C, Java, etc. The compiler 400 passes the code to the front end of the compiler 400 which includes the lexical analyzer 404 and the semantic analyzer or parser 406. At this stage or at any other stage in the compiler 400, a call path enforcement module 414 can perform all or part of the steps outlined in FIG. 2. The compiler 400 then operates on the source 402 in the back end, which includes the code optimizer 408 and the code generator 410. Often the division between the front end and the back end of a compiler is somewhat blurred. The compiler 400 can include other modules and can appear in different configurations. Other possible front end components include a preprocessing module and a semantic analysis module, not shown. The front end produces an intermediate representation of the code which is passed to the back end of the compiler 400. The back end of a compiler 400 can include an optimizer 408 and a code generator 410. Finally, the code generator 410 produces machine code 412 or object code. A linker, not shown, can combine the output 410 from several related compiled projects into a single executable file. A call path enforcement tool 416 separate from the compiler 400 can process the machine code 412 according to all or part of the steps outlined in FIG. 2 to produce modified machine code 418. The location and timing of the call path enforcement can determine the granularity of the control over specific functions. In one aspect, both a module in the compiler and a post-processing tool operating together perform the overall task of call path enforcement. Other compiler components and modules can be added within the spirit and scope of this disclosure.

Figure 5:
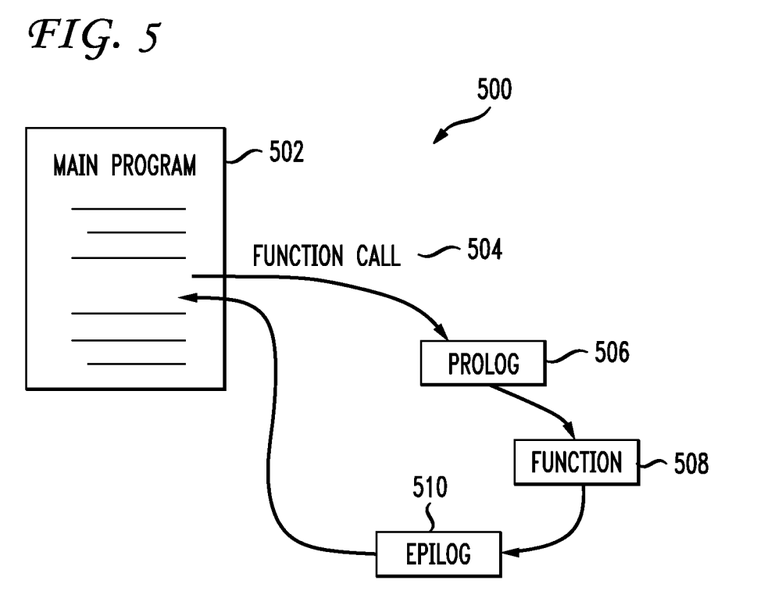
FIG. 5 illustrates a prior art approach to calling a function with a standard prolog and epilog setting up a stack frame.

FIG. 5 illustrates a prior art approach to calling a function with a standard prolog and epilog setting up a stack frame. In this approach 500, the main program 502 includes a body of instructions which includes a function call 504. The function call triggers a prolog 506 which sets up a stack frame 300, shown in FIG. 3, for the called function 508. The function 508 executes and uses the information in the stack frame 300, such as arguments 302, 304 and local variables 310. When the function 508 terminates, an epilog 510 tears down the stack frame and returns control to the main program 502.

Figure 6:
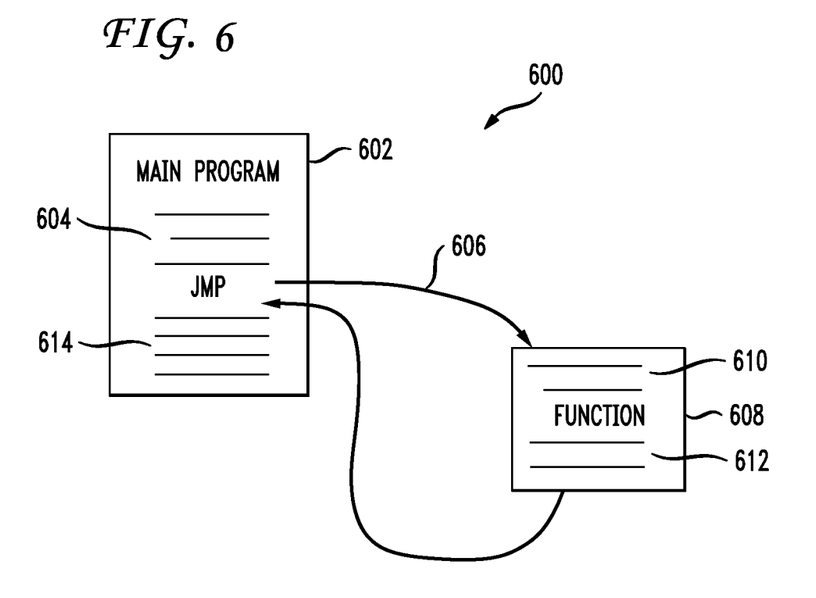
FIG. 6 illustrates an exemplary approach to calling a function without a standard prolog and epilog setting up a stack frame.

FIG. 6 illustrates an exemplary approach to calling a function without a standard prolog and epilog setting up a stack frame. The called function still relies on a stack frame, but the main program and the called function generate and tear down the stack frame in a non-standard way. In this approach 600, the main program 602 includes a body of instructions as in FIG. 5, but instead of calling a function with a corresponding prolog and epilog as in FIG. 5, a set of instructions equivalent to the prolog 506 in FIG. 5 is split between a first location 604 in the main program and a second location 610 in the function. Then, rather than calling the function in a conventional manner as shown in FIG. 5, the main program executes the instructions at the first location 604 and executes a JMP command 606 to jump in to the correct location in the function 608. The function 608 executes the instructions in the second location 610 to finish setting up the task frame. In this way, the combination of the instructions in the first location 604 and the second location 610 are functionally equivalent to the prolog. Then the function 608 uses the information in the stack frame set up by the combination of the first location instructions 604 and the second location instructions 610.

At the end of the execution, the function 608 contains instructions at a third location 612 which begin to tear down the stack frame (i.e. perform a portion of what an epilog would do in this situation). The function 608 then returns control to the main program 602, which then executes instructions at a fourth location 614 which complete the task of tearing down the stack frame. The function 608 can return control to the main program through another jump instruction or through any other suitable instruction or approach. In this way, the combination of the instructions in the third location 612 and the fourth location 614 are functionally equivalent to the epilog.

In one aspect, the function 608 includes different sets of instructions for completing the task of setting up the stack frame. This approach can further harden the binary against attackers by introducing variations so that an attacker who discovers one of the call replacements can not use that information to easily discover others. The main program can call the function by using different first sets of setup instructions 604 and jumping to different locations in the function 608 to execute corresponding second sets of setup instructions 610. For example, if the equivalent prolog performs steps A, B, C, D, E, then the main program 602 includes steps A, B, and jumps to location L in the function 608, which location performs steps C, D, E. In another call to the same function 608, the main program 602 includes steps A, B, C, D, and jumps to location L+2 in the function 608, which location performs step E. In this manner, the same function 608 can be called in different ways. In order to make available as many different variations as possible, the function 608 can include instructions equivalent to the entire prolog and/or the entire epilog. Likewise, the main program can include instructions equivalent to the entire prolog and entire epilog so that the jump instructions jumps directly into the function, bypassing all the prolog instructions in the function 608. This allows for the same function to be called in different ways because the target of the JMP command 606 determines what portion of the instructions in the function 608 are executed.

In another aspect, the annotated function is declared normally so that a compiler generates a traditional prolog and epilog in addition to dividing the prolog and epilog between the main program and the called function as discussed above. In this case, if an attacker invokes or calls the function directly in the normal manner, the instructions will perform unexpectedly because part or all of the stack frame instructions are executed twice. In this case, the function can include "trick" instructions before the second portion of the prolog instructions. When the function is invoked normally instead of via a jump instruction to the correct location, the function executes the trick instructions. The trick instructions can corrupt data, return an error, notify a software developer that the software is being tampered with, or perform any other desired set of instructions. In one aspect, executing the trick instructions can trigger additional obfuscations to the binary such that an attacker's progress in compromising software containing the annotated function is partially or entirely negated.

The principles disclosed herein can advantageously be combined with other obfuscation and/or software hardening techniques in order to resist attacks from malicious or mischievous individuals. A call replacement compiler or tool can randomly select a different call replacement structure for each annotated function such that even if an attacker discovers one technique, the others are not easily discoverable. A compiler or tool can determine variations based on the function annotations or automatically. In some instances, the functions in each distributed copy of the main program, such as copies available for download, are obfuscated differently so that the techniques of a successful attack on one copy are not directly applicable to other copies.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method for obfuscating a function call, the method comprising:
 receiving a computer program having an annotated function;
 determining via a processor prolog instructions for setting up a stack frame of the annotated function, epilog instructions for tearing down the stack frame, and a call site in the computer program for the annotated function, the call site including a function call;
 replacing the function call with a jump instruction, the jump instruction causing execution to transfer to the annotated function at runtime;

placing a first portion of the prolog instructions at a first location at the call site, the first location preceding the jump instruction;

placing a second portion of the prolog instructions at a second location at a beginning of the annotated function;

placing a first portion of the epilog instructions at a third location at an end of the annotated function; and placing a second portion of the epilog instructions at a fourth location at the call site, the fourth location after the jump instruction.

2. The computer-implemented method of claim 1, wherein the first portion of the prolog instructions and the second portion of the prolog instructions set up the stack frame when executed in combination.

3. The computer-implemented method of claim 1, wherein the first portion of the epilog instructions and the second portion of the epilog instructions tear down the stack frame when executed in combination.

4. The computer-implemented method of claim 1, wherein the second portion of the prolog instructions includes at least a subset of the first portion of the prolog instructions.

5. The computer-implemented method of claim 4, wherein the jump instruction causes execution to transfer to a location in the second portion of the prolog instructions based on an overlap of instructions in the first portion and the second portion of the prolog instructions.

6. The computer-implemented method of claim 1, wherein the annotated function includes at least one instruction prior to the second portion of the prolog instructions at the second location in the annotation function.

7. The computer-implemented method of claim 6, wherein the jump instruction causes execution to transfer to the second location in the annotation function, whereby the execution skips over the at least one instruction prior to the second portion of the prolog instructions.

8. The computer-implemented method of claim 6, wherein the at least one instruction prior to the second portion of the prolog instructions is at least one trick instruction, wherein executing the at least one trick instruction causes the computer program to perform at least one of corrupting data, returning an error, or notifying a software developer of tampering.

9. A compiler for compiling an obfuscated function call, the compiler comprising:

a processor;

a receiving module configured to control the processor to receive a computer program having at least one annotated function;

a determining module configured to control the processor to determine prolog instructions for setting up a stack frame of the annotated function, epilog instructions for tearing down the stack frame, and a call site in the computer program for the at least one annotated function, the call site including a function call;

a placement module configured to control the processor to replace the function call with a jump instruction to a location in the annotated function, place a first portion of the prolog instructions in the computer program listing preceding the jump instruction, place a second portion of the prolog instructions at a beginning of the annotated function, place a first portion of the epilog instructions at an end of the annotated function, and place a second portion of the epilog instructions after the jump instruction; and a compiling module configured to control the processor to compile the received computer program listing based on the placed portions of the prolog and epilog instructions.

10. The compiler of claim 9, wherein the first portion of the prolog instructions and the second portion of the prolog instructions set up the stack frame when executed in combination.

11. The compiler of claim 9, wherein the first portion of the epilog instructions and the second portion of the epilog instructions tear down the stack frame when executed in combination.

12. The compiler of claim 9, wherein the second portion of the prolog instructions includes all of the determined prolog instructions.

13. The compiler of claim 12, wherein the jump instruction jumps to a location in the second portion of the prolog instructions based on the first portion of the prolog instructions.

14. A non-transitory computer-readable storage medium storing a computer program having instructions for controlling a processor to obfuscate a function call, the instructions, when executed by the processor, causing the processor to perform the steps:

receiving a compiled computer program having an annotation associated with a function;

determining prolog instructions for setting up a stack frame of the function, epilog instructions for tearing down the stack frame, and a call site in the computer program for the function, the call site include a function call;

replacing the function call with a jump instruction, the jump instruction causing execution to transfer to the function at runtime;

placing a first portion of the prolog instructions at a first location at the call site preceding the jump instruction;

placing a second portion of the prolog instructions at a second location at a beginning of the function;

placing a first portion of the epilog instructions at a third location at an end of the function; and placing a second portion of the epilog instructions at a fourth location at the call site, the fourth location after the jump instruction.

15. The non-transitory computer-readable storage medium of claim 14, the instructions further causing the processor to randomly select a split of prolog instructions between the first and second portions, and randomly select a split of epilog instructions between the third and fourth portions.

16. The non-transitory computer-readable storage medium of claim 14, wherein the annotation designates at least one of a performance level, a complexity level, or a security level.

17. The non-transitory computer-readable storage medium of claim 16, wherein if the annotation designates a high complexity level, the instructions further comprise applying other obfuscation techniques to one or more of the prolog instructions and the epilog instructions.

18. The non-transitory computer-readable storage medium of claim 16, wherein determining prolog instructions and epilog instructions is based on the annotation.

19. A computer-implemented method comprising:

receiving a computer program having a first annotated function;

determining via a processor first prolog instructions for setting up a stack frame of the first annotated function, first epilog instructions for tearing down the stack frame, and a first call site in the computer program for the first annotated function, the first call site including a first function call to the first annotated function;

replacing the first function call with a first jump instruction, the first jump instruction causing execution to transfer to the first annotated function at runtime;

inserting a first portion of the first prolog instructions at a first location at the first call site, the first location preceding the first jump instruction;

inserting a second portion of the first prolog instructions at a second location at a beginning of the first annotated function;

inserting a first portion of the first epilog instructions at a third location at an end of the first annotated function; and inserting a second portion of the first epilog instructions at a fourth location at the first call site, the fourth location after the first jump instruction.

20. The computer-implemented method of claim 19 further comprising:

the computer program having a second annotated function;

determining a second prolog instructions for setting up a stack frame of the second annotated function, second epilog instructions for tearing down the stack from, and a second call site in the computer program for the second annotated function, the second call site including a second function call to the second annotated function, wherein the second prolog instructions differ from the first prolog instructions and the second epilog instructions differ from the first epilog instructions;

replacing the second function call with a second jump instruction, the second jump instruction causing execution to transfer to the second annotation function at runtime;

inserting a second portion of the second prolog instructions at a fifth location at the second call site, the fifth location preceding the second jump instruction;

inserting a second portion of the second prolog instructions at a sixth location at a beginning of the second annotated function;

inserting a first portion of the second epilog instructions at a seventh location at an end of the second annotated function; and inserting a second portion of the second epilog instructions at an eighth location at the second call site, the eighth location after the second jump instruction.

21. The computer-implemented method of claim 20, wherein the second prolog instructions differ from the first prolog instructions and the second epilog instructions differ from the first epilog instructions based on an obfuscation applied to each of the first prolog instructions, second prolog instructions, first epilog instructions, and second epilog instructions.

22. A computer-implemented method comprising:

receiving a computer program having an annotated function, a first call site, and a second call site, the first call site including a first function call to the annotated function, the second call site including a second function call to the annotated function;

determining via a processor prolog instructions for setting up a stack frame of the annotated function and epilog instructions for tearing down the stack frame;

replacing the first function call with a first jump instruction, the first jump causing execution to transfer to the annotated function at runtime;

inserting a first version of a first portion of the prolog instructions at a first location at the first call site, the first location preceding the first jump instruction;

inserting a second portion of the prolog instructions at a second location at a beginning of the annotated function;

inserting a first portion of the epilog instructions at a third location at an end of the annotated function; and inserting a first version of a second portion of the epilog instructions at a fourth location at the first call site, the first location after the first jump instruction.

23. The computer-implemented method of claim 22 further comprising:

replacing the second function call with a second jump instruction, the second jump instruction causing execution to transfer to the annotated function at runtime;

inserting a second version of the first portion of the prolog instructions at a fifth location at the second call site, the fifth location preceding the second jump instruction;

inserting a second version of the second portion of the epilog instructions at a sixth location at the second call site, the sixth location after the second jump instruction.

24. The computer-implemented method of claim 23, wherein the first version of the first portion and the second version of the first portion are semantically equivalent, and the first version of the second portion and the second version of the second portion are semantically equivalent.

25. The computer-implemented method of claim 22, wherein inserting the second portion of the prolog instructions includes replacing an existing prolog in the annotated function, and wherein inserting the first portion of the epilog instructions includes replacing an existing epilog in the annotated function.

26. The computer-implemented method of claim 22, wherein executing the first portion of the epilog instructions causes execution to transfer to the second portion of the epilog instructions using a jump instruction.

* * * * *

UNITED STATES PATENT AND TRADEMARK OFFICE
CERTIFICATE OF CORRECTION

PATENT NO. : 8,423,974 B2
APPLICATION NO. : 12/540195
DATED : April 16, 2013
INVENTOR(S) : Gideon M. Myles et al.

It is certified that error appears in the above-identified patent and that said Letters Patent is hereby corrected as shown below:

In the Claims:

In Claim 14, Column 12, line 26, please change "the call site include a function" to --the call site including a function--.

In Claim 20, Column 13, line 17, please change "determining a second" to --determining second--.

In Claim 20, Column 13, line 28, please change "the second annotation function" to --the second annotated function--.

Signed and Sealed this
Sixteenth Day of July, 2013

Teresa Stanek Rea
*Acting Director of the United States Patent and Trademark Office*